Aug. 31, 1954  M. V. KIEBERT, JR  2,688,131
PILOT WARNING INDICATOR SYSTEM
Filed May 31, 1945  2 Sheets-Sheet 1

Inventor
Martin V. Kiebert Jr.
By Ralph L Chappell
Attorney

Aug. 31, 1954    M. V. KIEBERT, JR    2,688,131
PILOT WARNING INDICATOR SYSTEM
Filed May 31, 1945    2 Sheets-Sheet 2

Inventor
Martin V. Kiebert Jr.
By Ralph L Chappell
Attorney

Patented Aug. 31, 1954

2,688,131

UNITED STATES PATENT OFFICE 2,688,131

PILOT WARNING INDICATOR SYSTEM

Martin V. Kiebert, Jr., United States Navy

Application May 31, 1945, Serial No. 596,936

7 Claims. (Cl. 343—7)

(Granted under Title 35, U. S. Code (1952), sec. 266)

This invention relates in general to automatic load release equipment of the electronic computer type for use on aircraft such as, for example, in bombing surface targets.

The general object of the invention is to provide the pilot of the aircraft with a warning signal in advance of the time that the bomb or other load is automatically released from the plane.

A more specific object is to provide the pilot with a warning signal which is derived from the same output which serves to effect release of the bomb or other load carried by the aircraft at the proper time as determined by the altitude of the attacking plane, its distance from the target and the relative speed at which the plane is coming on the target. When the pilot receives the warning signal, it thus indicates to him that the electronic load equipment is functioning properly in computing the time of load release and assures him that his bomb or other load will release automatically and at the proper time to strike the target.

A more specific object is to provide a warning signal of the type described above from control apparatus comprising a pair of control tubes. The output circuit from the first tube is used to control the release of the bomb or other load from the plane, and the output circuit from the second tube is used to actuate the alarm device previously referred to. The two tubes are differently biased beyond cut-off. The control voltage appearing at the output of the computing device is applied equally and simultaneously to both tubes. The second tube is biased beyond cut-off to a lesser extent than is the first tube, and hence will reach conduction ahead of the first tube. Thus, the alarm device will be actuated in advance of the time at which the load release device is actuated.

The advantage of my warning signal is obvious, for should the pilot fail to receive the warning signal, he will then know that the computing equipment is not functioning properly and, hence, would not operate to release the load automatically. Under such conditions, he must then act himself to estimate the proper time at which the load should be released and effect such release through use of a manually operated load release mechanism.

Referring now to the drawings, Fig. 1 illustrates a preferred embodiment of the invention as applied to a particular device for automatically effecting the release of a bomb or other load from an aircraft 10 flying at a comparatively low altitude (50–300 feet) and directed at an isolated or semi-isolated target such as a marine surface vessel 11;

Figure 1:
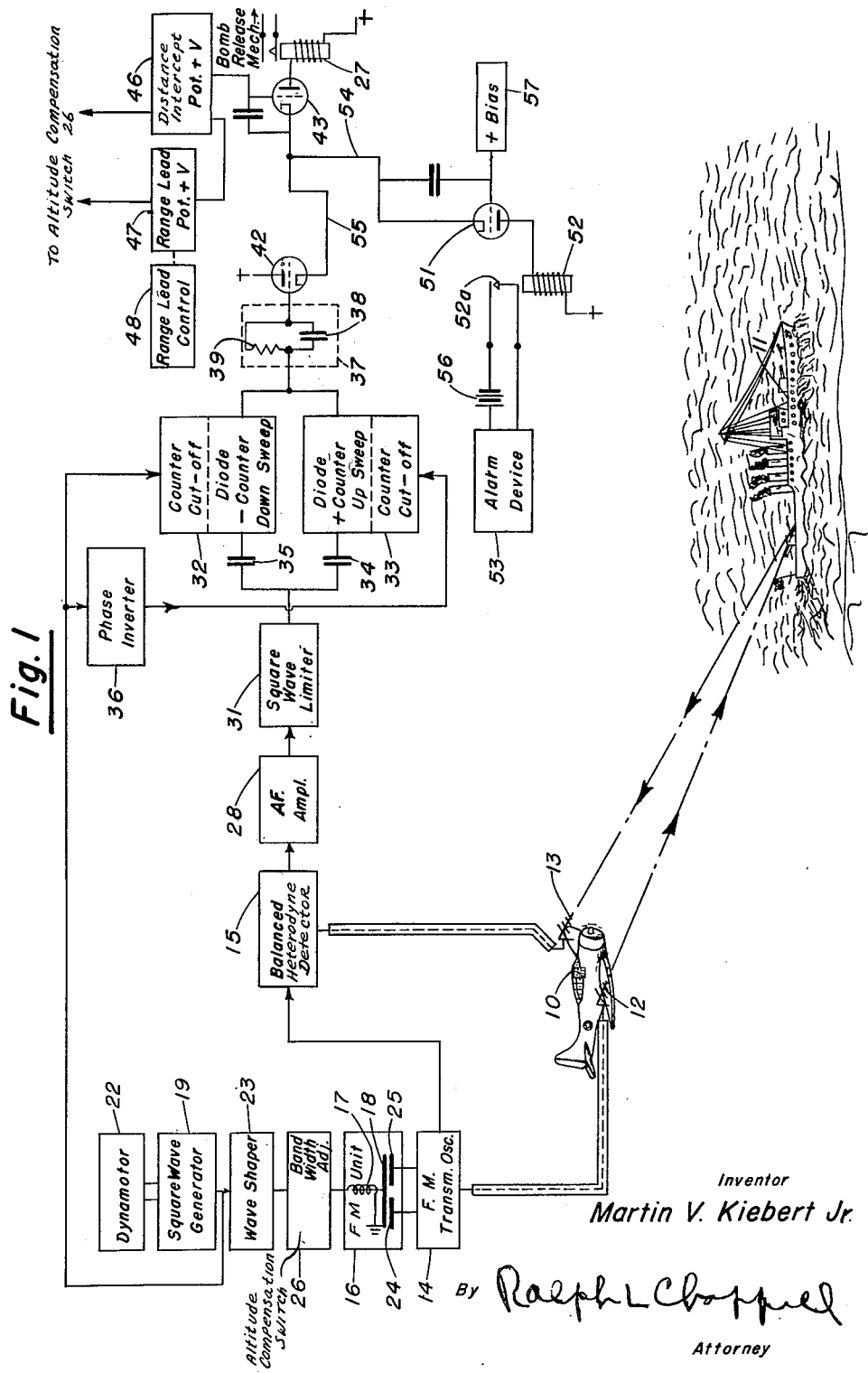

The bomb is caused to be released while the aircraft is approaching vessel 11 at the proper time so that the bomb will strike it. Alternatively, by controls to be explained hereinafter, bomb release may be effected at such time as will cause the bomb to strike the vessel at any preselected distance from 0 to 100 feet ahead of the target. This latter arrangement is of particular advantage when a "skip bombing" technique is employed.

The problem to be solved by the apparatus requires the following conditions to be determined and evaluated:

(1) Height of the plane (or bomb) above sea level.

(2) Horizontal distance to the target (Range).

(3) Relative horizontal speed between plane and target (Range rate).

Plane 10 may be accurately flown at a preselected altitude with the aid of an altimeter of the FM radio type such as described in U. S. Patent 2,206,903, issued July 9, 1940, to R. F. Lane et al. This will take care of condition 1. The horizontal distance to the target vessel, condition 2, is indirectly determined by measuring the slant distance from plane 10 to target 11 by the frequency modulation technique. "Yagi" type antenna 12 is used to beam the high frequency radio waves forward, but sufficiently downward to be reflected back from vessel 11 to receiving antenna 13 also of the "Yagi" type. Thus the time required for the wave to travel from the plane 10 to target 11 and back again, and hence the distance, may be evaluated. Condition 3 is evaluated in terms of slant relative speed between plane 10 and target 11 by utilizing the Doppler effect produced by the rapid approach of the plane 10 towards the target.

Figure 2:
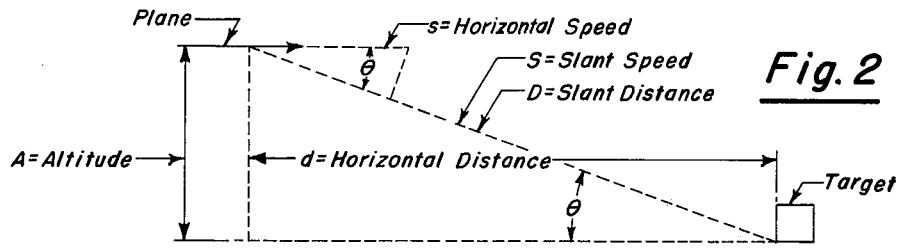
Fig. 2 is a diagram illustrating the factors entering into the problem of computing the time of load release from the aircraft.

Employing well known mathematical relationships, the following equation relating to Fig. 2 can be developed:

$$D^2 - S\left(\frac{\sqrt{A}}{4.01} + T\right)D - A^2 = 0 \qquad (1)$$

where:

$D$ = Proper dropping distance in feet measured on the direct slant path.
$S$ = Relative speed in feet per second, measured on the direct slant path.
$A$ = Altitude in feet.
$T$ = Total time delay (inherent delay in response of system components) = .36 second.

$\frac{\sqrt{A}}{4.01}$ = Time of free space fall in seconds

Figure 3:
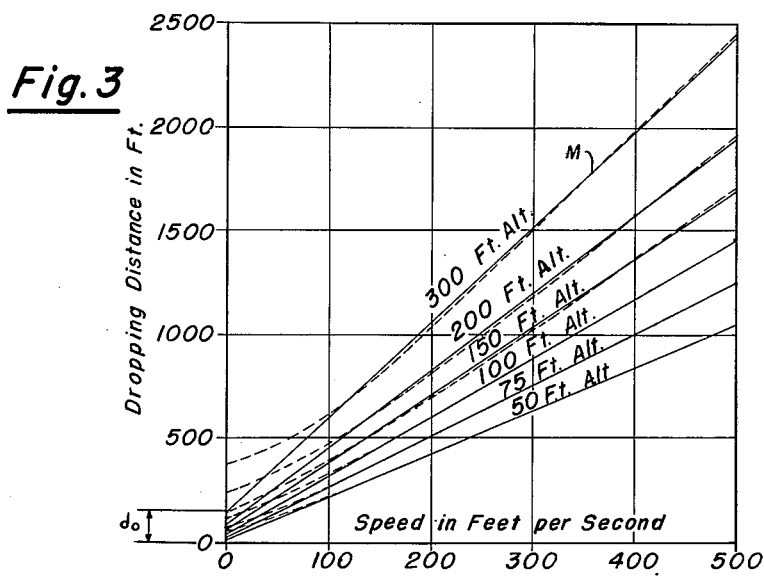
Fig. 3 is a plot of curves showing the relation between speed and dropping distance for several different altitudes.

Equation 1 can then be used to plot a series of speed vs. distance curves for altitudes of 50, 75, 100, 150, 200 and 300 feet, as shown by dotted lines in Fig. 3. These curves do not pass through zero since the apparatus measures the slant speed and slant distance, and when the airplane 10 is directly above target 11, the distance to the target is the altitude of the airplane. These curves representing Equation 1 are not used to calibrate the equipment because of the difficulty of compensating the equipment for a non-linear relationship between speed and distance. Rather, straight-line approximations to the curves are shown, and these are shown by the solid lines in Fig. 3.

The equations of the straight lines are of the mathematical form:

$$D = MS + d_0 \qquad (2)$$

the new factors being $M$ = Slope of the straight line, and
$d_0$ = Distance intercept at zero speed, in feet.

The distance intercept $d_0$ corresponds in a general way to plane altitude, but because of the approximations made (i. e., total time delay and linear approximation), departs considerably in numerical value from the plane's actual altitude.

The present apparatus solves Equation 2 automatically for each of several altitudes, the pilot operating a switch for this purpose. The manner in which the solution is obtained is explained in the paragraphs which follow. Since each altitude requires a different slope $M$, the apparatus is designed to give this required slope by varying the bandwidth of the frequency swept by the transmitter component of the apparatus. Hence, the bandwidth is a function of the time of drop plus the delay due to mechanical and electrical inertia of apparatus components.

In Fig. 1, a linear frequency modulated signal is generated in a transmitter oscillator 14. This signal is delivered to the transmitting antenna 12 and also is fed directly to a balanced heterodyne detector 15. Linear frequency modulation of transmitter oscillator 14 is produced by a vibrating condenser type of frequency modulator unit 16. Modulator unit 16 is comprised of a permanent magnetic field (not shown) and a moving coil 17 driving a metal diaphragm 18 which acts as the moving plate of a frequency modulator condenser. A generator 19 driven by a dynamotor 22 delivers a square wave voltage to a wave-shaping circuit 23, which converts the square wave to a substantially triangular one. The output from wave shaper 23 is applied to the moving coil 17. This produces a linear type of motion to diaphragm 18 which moves relative to a pair of fixed condenser plates 24 and 25. The amplitude of the square wave output from generator 19 determines the maximum $f_2$ and minimum $f_1$ limits of modulation of the R. F. carrier signal generated in the oscillator 14, and such amplitude is adjusted by means of an altitude compensation switch 26 which is interposed between the triangular wave shaper 23 and modulator unit 16. The period of the output from square wave generator 19 is determined by the speed of dynamotor 22 and fixes the repetition rate or modulation cycle of the modulation of the high frequency carrier wave generated in the transmitter oscillator 14.

*Measurement of distance (distance voltage)*

Figure 4:
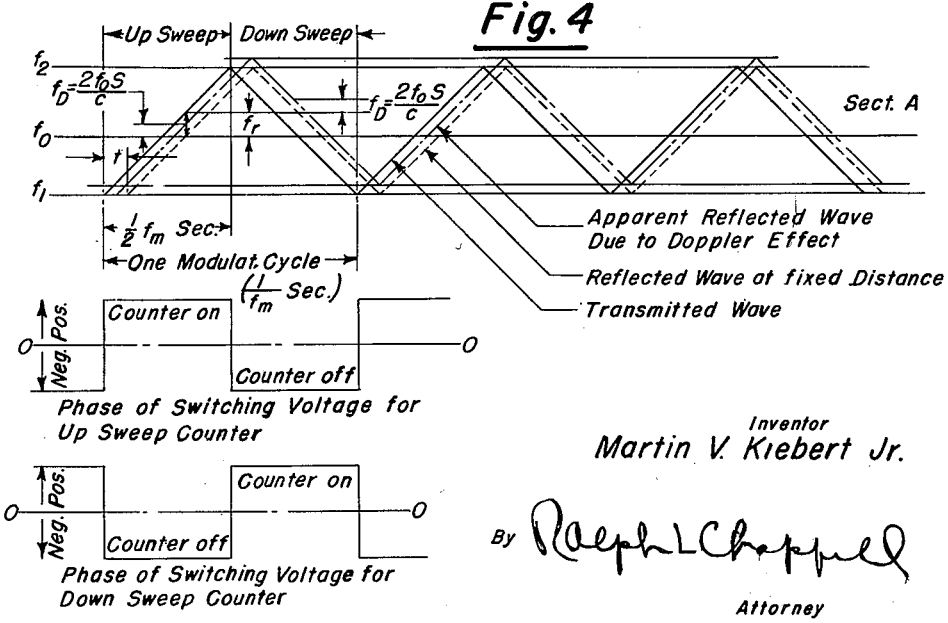
Fig. 4 is a plot showing the relation between the transmitted and reflected frequency modulated waves.

The frequency modulated wave is transmitted from the plane 10 to and reflected back from the target 11. Referring to Fig. 4, the instantaneous frequency of the reflected wave lags the instantaneous frequency of the transmitted wave by $$\frac{2D}{C}$$

where $D$ is the distance from the transmitter to the target in feet, and $C$ is the speed of light in feet per second. Since a portion of the transmitted wave is fed direct from the transmitter 14 into detector 15, the transmitted and reflected waves will heterodyne in detector 15 to produce a comparatively low frequency beat-note, the frequency of which is proportional to target distance. In Fig. 4, $f_1$ and $f_2$ define the limits of R. F. sweep of the transmitter. For each complete modulation cycle, the total number of cycles per second swept through will then be $2(f_2 - f_1)$. If $f_m$ is the modulation frequency in cycles per second, then the total number of cycles per second swept in one second will be $2f_m(f_2 - f_1)$. The frequency of the signal reflected from the target 11 is shown as the dotted line displaced from that for the transmitted signal by a time $$t = \frac{2D}{C}$$

hence, the resultant instantaneous frequency difference $f_r$ between transmitted and reflected signals will be $$f_r = \frac{4f_m(f_2 - f_1)D}{C} \text{ cycles per second} \qquad (3)$$

or $$f_r = \frac{W f_m D}{246} \qquad (4)$$

where $W = (f_2 - f_1) 10^6$ megacycles per second per sweep. The number of cycles per second of beat-note per foot of distance from plane 10 to target 11 will then be $$\frac{W f_m}{246}$$

The foregoing thus gives information for the measurement of distance between plane and target in terms of beat-note output of the detector 15. Furthermore, the number of cycles per second per foot of target distance can be varied directly by varying the sweep width $W$, which is done conveniently by changing the amplitude of the driving voltage supplied by wave shaper 23 to the frequency modulator unit 16 associated with the R. F. oscillator component 14 of the transmitting apparatus.

The sweep width $W$ is set to give the proper slope to the calibration curve for each altitude by means of the altitude compensation switch 26 which varies the voltage supplied to coil 17 of the condenser modulator unit. The same switch also provides the proper amount of bias to represent the distance intercept $d_0$.

Measurement of speed S (speed voltage)

Since the distance from target 11 at which the bomb must be released from plane 10 is dependent upon the forward speed of the airplane relative to the target as well as the altitude, it is necessary that this speed be evaluated by the apparatus. As previously explained, use is accordingly made of the so-called Doppler effect produced by the approach of the plane to the target.

It can be shown that for the present apparatus, $$f_d = f_0 + \left(\frac{2S}{C}\right)f_0 \qquad (5)$$

where $f_d$ is the apparent received frequency, $f_0$ is the transmitted frequency, C is the speed of the wave energy in feet per second, and S is slant speed of airplane 10.

From Equation 5, the apparent increase in frequency due to the Doppler effect is thus $$2\left(\frac{S}{C}\right)f_0$$

Frequency $f_0$ is the center or average F-M frequency and as such is a constant. Furthermore, the speed C of the radio wave is also constant. Thus, the horizontal component of the Doppler frequency, i. e., the apparent change in frequency due to the Doppler effect, is a constant times the relative slant speed of the plane 10 toward target 11 divided by cos θ, where θ is as defined in Fig. 2.

Information in reflected signal

Section A of Fig. 4 represents the transmitted signal, the reflected signal, and the apparent signal due to Doppler effect. As indicated, the apparent reflected signal will always be greater in frequency at any instant than the reflected signal without Doppler effect by an additional number of cycles equal to $$2\frac{f_0}{C}S$$

This is a constant times the slant speed S of the plane. Evaluating the constant (where $f_0 = 410 \times 10^6$ cycles per second) results in the equation $$\text{Doppler frequency } f_D = 2\frac{f_0}{C}S = .833S \qquad (6)$$

It will be noted from Fig. 4 that the period during which the transmitted frequency is increasing in value is shown and defined as the up-sweep, and the period during which the transmitted frequency is decreasing is defined as the down-sweep.

Previously in the specification, it was indicated that the received beat signal $f_r$ without Doppler was equal to $$\frac{Wf_mD}{246}$$

Referring again to Fig. 4, the apparent reflected R. F. signal with Doppler will be $$f_0 + f_D = f_0 + \frac{2f_0 S}{C} \qquad (7)$$

at a time angle or delay of $$\frac{2D}{C}$$

seconds with respect to the transmitted signal. The resultant instantaneous frequency difference with Doppler, between the transmitted and reflected signals during the up-sweep is given by the equation $$f_u = \frac{Wf_mD}{246} - \frac{2f_0 S}{C} = f_r - f_D \qquad (8)$$

During the down-sweep, the equation becomes $$f_d = \frac{Wf_mD}{246} + \frac{2f_0 S}{C} = f_r + f_D \qquad (9)$$

Therefore, when the transmitted and reflected signals are mixed in the detector 15, two audio frequencies will occur, one $f_u$ during the up-sweep and the other $f_d$ during the down-sweep. For any given altitude, the equations may be written $$f_u = KD - K_1 S \qquad (10)$$
$$f_d = KD + K_1 S \qquad (11)$$

where K and $K_1$ are constants, D and S are the slant distance and relative slant speed, respectively, $f_r$ is the beat frequency resulting from distance, and $f_D$ is the Doppler frequency resulting from relative speed.

Equations 10 and 11 indicate that the two frequencies will each be composed of both distance and speed factors. The up-sweep frequency $f_u$ is the difference, and the down-sweep frequency $f_d$ is the sum, of the distance and speed variables. The apparatus constantly measures these two variables; when they represent a solution to Equation 2 in terms of pre-set altitude, a relay 27 is tripped and the bomb released from plane 10. Actually, the apparatus subtracts Equation 11 from Equation 10 (the K in Equation 11 is made different from the K in Equation 10), and when the difference is a solution to Equation 2, the bomb release relay 27 is tripped.

Method of obtaining voltages proportional to distance and speed

The low frequency beat signals from the detector 15 are put through a multi-stage amplifier unit 28 and then converted into square waves by a limiter stage 31 for delivery to a pair of differentially connected counters or frequency determining circuits 32, 33. The output of limiter stage 31 is fed through capacitor 34 into the up-sweep counter 33, and through capacitor 35 into the down-sweep counter 32. The up-sweep and down-sweep counter circuits are keyed on and off by application of the square wave output from generator 19. As this is the same square wave output which furnishes the sweep voltage for the transmitter 14, keying of the counters 32, 33 will always remain in a fixed phase relationship with the transmitter R. F. sweep. The square wave from generator 19 is fed without phase reversal to the down-sweep counter 32 but goes through a phase reversal of 180° in a phase inverter 36 before keying the up-sweep counter 33. Consequently, only the up-sweep counter 33 operates during the increase in frequency of the R. F. carrier wave, and only the down-sweep counter 32 operates during the decrease in frequency of the carrier wave. Counters 32, 33 feed into a common load 37 comprised of a capacitor 38 and resistor 39.

The sensitivity of the up-sweep counter 33 is made greater than that of down-sweep counter 32 by so choosing condensers 34, 35 that the capacitance of condenser 34 is greater than that of condenser 35. A ratio of the two of 1.42 is satisfactory so that the distance voltages will not cancel out in the common load 37.

Generation of speed voltage

With airplane 10 moving toward the target 11 at some given speed, then as previously explained, a Doppler frequency will be obtained which will be proportional to the speed. The presence of the Doppler effect will increase the frequency of the resultant beat-note during the down-sweep and decrease it during the up-sweep. Thus, since the frequencies applied to counters 32 and 33 are no longer the same, it being remembered that the two counters operate alternately, the load circuit becomes unbalanced and a resultant average current component flows through resistance 39 which is proportional to speed. Since the sweep of counters 32 and 33 is phased with the R. F. sweep of the carrier wave so that during the down-sweep only the negative counter is operating, then the resulting average current component, which is proportional to speed, is negative.

Generation of distance voltage

If the distance from the aircraft 10 to the target 11 is constant and condenser 34 is larger than condenser 35, then the average current component through resistor 39 will be unbalanced in a positive direction, since the sensitivity of counter 33 is greater than counter 32. Since condenser 34 is in the up-sweep counter circuit, the resultant average current component, which is proportional to distance, is positive. Hence, for any fixed distance from the target 11, a positive average current component will appear through resistor 39 whose amplitude is proportional to the slant distance.

Combination of speed and distance voltages

Under a condition of unequal counter capacitors 34, 35, and in the presence of the Doppler effect, it is seen that there now appears through resistor 39 a negative average current component due to speed, and a positive average current component due to distance. As has been previously stated, the resultant beat-note during the up-sweep $f_u$ is proportional to $(D-S)$, and during the down-sweep, $f_d$ is proportional to $(D+S)$. Since counters 32, 33 have a linear characteristic, the up-sweep voltage $V_u$ developed across the common load 37 will be $$V_u = C_u R f_u \frac{E_s}{2} \quad (12)$$

Similarly, the down-sweep voltage $V_d$ developed across this common load 37 will be $$V_d = C_d R f_d \frac{E_s}{2} \quad (13)$$

where $C_u$ = Up-sweep capacitor 34
$C_d$ = Down-sweep capacitor 35
$R$ = Total load resistor of counter
$f_u$ = Up-sweep frequency
$f_d$ = Down-sweep frequency
$E_s$ = Square wave voltage from limiter 31

The load voltage will be $$V_u - V_d = C_u f_u R \frac{E_s}{2} - C_d f_d R \frac{E_s}{2}$$

$$= (C_u f_u - C_d f_d) R \frac{E_s}{2} \quad (14)$$

But as previously developed $f_u = KD - K_1 S$
$f_d = KD + K_1 S$ where $D$ and $S$ are slant distance and speed, respectively, and $K$ and $K_1$ are constants. Substituting $$V_u - V_d = [C_u(KD - K_1 S) - C_d(KD + K_1 S)] R \frac{E_s}{2}$$

$$= [K(C_u - C_d)D - K_1(C_u + C_d)S] R \frac{E_s}{2} \quad (15)$$

Since $K$, $K_1$, $C_u$, $C_d$, $R$ and $E_s$ are all constants, they may be lumped and the equation becomes $$\text{Average } V_{\text{load}} = K_3 D - K_4 S \quad (16)$$

Equation 16 indicates that the load 37 has a positive voltage proportional to slant distance and a negative voltage proportional to slant speed. If the speed is constant, only the voltage due to distance varies appreciably as the plane 10 approaches the target 11. (Actually, of course, the measured slant speed varies slightly as a function of cosine $\theta$.) Hence as the distance to the target decreases, the total load voltage across resistor 39 decreases, i. e., the load voltage becomes less positive. It is to be noted, however, that the voltages from the up-sweep and down-sweep counters 33 and 32 each contain components of both speed and distance; hence, it cannot be said that the distance or speed comes from either counter alone.

Application of resultant speed and distance voltage

The resultant load voltage appearing across capacitor 38 is applied to the grid of a cathode follower stage 42. The cathode follower tube 42 has unity gain and essentially zero phase shift, so a voltage of the same magnitude and polarity appears at its cathode as is present at any instant on capacitor 38. The cathode follower 42 also serves as an impedance transformer and as a unidirectional isolation between capacitor 38 and a relay amplifier tube 43. The cathode of the relay amplifier 43 is connected to the cathode of the cathode follower 42 so that the cathode of the relay amplifier 43 is also at the same potential as load capacitor 38 at all times.

Correction for distance intercept $d_0$ and range lead compensation

In order to compensate for the condition that the target distance at zero speed is not zero, it is necessary to introduce a correction voltage so as to cause bomb release relay 27 (which is connected in the anode circuit of the relay amplifier 43) to operate earlier by an amount equal to the "distance intercept," as previously explained. Since this latter factor varies with altitude, the correction voltage applied must likewise vary with altitude. This control is therefore ganged with the sweep width control in the manually operated altitude compensation switch 26 and supplies a positive potential increasing with altitude from a potentiometer 46 to the grid of relay amplifier 43.

If it is desired that the bomb fall from 0 to 100 feet short of the target, a further positive voltage in addition to that derived to correct for the distance intercept must be applied to the grid of relay amplifier 43. The amount of the range lead compensation potential necessary for a given range lead will, of course, also vary with the altitude of the plane. Hence, such potential can be conveniently taken off a range lead potentiometer 47 which is varied jointly by the altitude compensation switch 26 and a range lead control 48.

The positive voltages obtained from potentiometers 46 and 47 are supplied in an additive manner to the grid of relay amplifier 43, and the two determine the total fixed positive bias on this grid.

Time of operation of bomb release relay

The differential output voltage which appears across capacitor 38 is applied to the cathode of the relay amplifier 43. As previously explained, this voltage will have a positive value variable with the target range and range rate. Also, the grid of amplifier 43 is set at a fixed positive potential dependent upon altitude and range lead. Now, as airplane 10 closes the range to the target 11, the positive voltage appearing at the cathode of relay amplifier 43 will gradually decrease with the result that this cathode becomes less positive with respect to its grid, ultimately reaching the cut-on point of the tube 43 and initiating current flow in the anode-cathode circuit of this tube. The winding of the bomb release relay 27 is connected in this latter circuit and, of course, requires a minimum amount of current in order to cause the relay to pull in its armature and close the bomb release circuit and associated bomb release mechanism which it controls. Thus, when the cathode of the relay amplifier 43 has become sufficiently negative with respect to its grid by a reduction in the positive voltage across the capacitor 38 to cause this minimum current to flow through the cathode-anode circuit of relay amplifier 43, the relay 27 will be actuated. To put it in another way, since the winding of relay 27 requires a certain minimum amount of current to operate its armature, there is one minimum voltage difference between the grid and cathode of the relay tube 43 which will trigger the relay 27. For each preset altitude and range lead, therefore, there is only one minimum voltage from capacitor 38 which will throw relay 27. Hence, Equation 16 becomes $$K_3 D - K_4 S = K_6$$

or $$D = \frac{K_4}{K_3} S + \frac{K_5}{K_3} \quad (17)$$

With $$\frac{K_4}{K_3} = M$$

and $$\frac{K_5}{K_3} = d_0$$

Equation 17 becomes identical to Equation 2, i.e., $$D = MS + d_0$$

Thus it is seen that the apparatus solves the equation which the basic theory evolved as the requirement for bomb release at the proper instant.

The apparatus so far described is conventional; hence, no novelty thereto per se is claimed in this application. As previously stated in the opening of this specification, this invention relates to an improvement in apparatus of the type which has been described, wherein the pilot of the aircraft is furnished with a warning signal in advance of actuation of the bomb release relay which thus indicates to him that the bomb release apparatus is functioning properly in computing the time of bomb release, and thus assures him that the bomb load will be released automatically at the proper time.

In a preferred embodiment of the invention, the warning signal is actuated by the same output utilized to actuate the bomb release relay, namely, the voltage output from the differentially connected counters 32 and 33.

The warning unit comprises an amplifier 51, relay 52, and alarm device 53. The alarm device, indicated only in block form, may be of any suitable type operated electrically such as, for example, a signal light, bell, vibrator, etc.

The cathode of amplifier 51 is connected by a line 54 to line 55 which ties the cathodes of tubes 42 and 43 together. Hence, the voltage appearing at the cathode of tube 51 will be the same as that appearing at the cathodes of tubes 42 and 43, which voltage, as previously explained, is the same as the voltage across the load capacitor 38.

The coil of relay 52 is connected in the anode circuit of tube 51 and when this relay is energized sufficiently to close the contacts 52a, the circuit between the alarm device 53 and its source of power supply 56 is completed, thus actuating the alarm and giving the pilot the warning signal referred to above.

A source 57 of positive potential is applied to the grid of tube 51. This biasing potential is so selected that it will be much higher than the total positive bias which is placed upon the grid of tube 43 from the potentiometers 46 and 47.

The warning device operates as follows: When the pilot first sights the target and turns on the FM radio ranging apparatus, previously described, which computes the time for actuation of the bomb release relay as a function of target range and range rate, the positive output appearing on load condenser 38, appearing also at the cathodes of tubes 42 and 43 will be comparatively high because at such time, the target range is comparatively great. At such time as aforedescribed, the cathode of tube 43 will be exceedingly positive with respect to its grid and, hence, tube 43 will be held in a non-conductive state. The high positive output appearing at the cathode of tube 51 will also be so positive with respect to its grid that this tube will likewise be in a non-conductive state. However, as soon as the target range begins to decrease with the approach of the plane 10 to the target 11, the positive potential of the cathode of tube 51 will begin to drop. Thus, since the grid tube 51 is provided with a positive bias much higher than that applied to the grid of tube 43, tube 51 will reach conduction much earlier than tube 43. Thus, relay 52 in the anode circuit of tube 51 will pull in ahead of relay 27, and the alarm device 53 will be actuated in advance of the bomb release relay 27 which, as previously explained, is not energized until tube 43 is rendered conductive.

In conclusion, it is to be understood that while the embodiment of the invention which has been described is to be preferred, changes in the construction and arrangement of parts may occur to those skilled in the art. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

What is claimed is:

1. In an automatic load release system for an aircraft, means for transmitting a frequency modulated radio wave from the aircraft towards a target, means for receiving the target reflected wave, means for mixing the transmitted and reflected waves to produce a beat frequency wave, means for deriving an output signal from said beat frequency wave proportional to the target range and range rate of change with respect to the aircraft, first and second control tubes each having input and output circuits, a load release device responsive to the current in the output circuit of said first tube for releasing the load from the aircraft, an alarm device responsive to the current in the output circuit of said second tube, means for applying said signal to the input circuits of said tubes, and means differently biasing said tubes.

2. In an aircraft automatic load release system, means for transmitting a frequency modulated radio wave from the aircraft towards a target, means for receiving the target reflected wave, means for mixing the transmitted and reflected waves to produce a beat frequency wave, means for deriving an output signal from said beat frequency wave variable with target range and range rate of change with respect to the aircraft, first and second control tubes, a load release device responsive to the current in the cathode-anode circuit of said first tube for releasing the load from the aircraft, an alarm device responsive to the current in the cathode-anode circuit of said second tube, means for applying said signal to said tubes to control the current in their respective cathode-anode circuits, and means biasing said tubes differently beyond cut-off so that said second tube reaches conduction in advance of said first tube.

3. In an aircraft automatic load release system, means for transmitting a frequency modulated radio wave from the aircraft moving towards a target to said target, means for receiving the target reflected wave, means for mixing the transmitted and reflected waves to produce the beat frequency wave, means for deriving a voltage from said beat frequency wave variable with target range and range rate of change with respect to the aircraft, first and second control tubes, a load release device controlled by the output of said first tube for releasing the load from the aircraft, an alarm device controlled by the output of said second tube, means applying said variable voltage to the inputs of said tubes, fixed voltage means biasing said second tube beyond cut-off, and fixed voltage means biasing said first tube further beyond cut-off than said second tube so that as said variable voltage changes, said second tube will reach conduction in advance of said first tube.

4. In an aircraft automatic load release system, means for transmitting a frequency modulated radio wave from the aircraft moving towards a target to said target, means for receiving the target reflected wave, means for mixing the transmitted and reflected waves to produce the difference frequency wave, means for deriving a control voltage from said difference frequency wave variable with target range and range rate of change with respect to the aircraft, first and second control tubes, a load release device controlled by the output of said first tube for releasing the load from the aircraft, an alarm device controlled by the output of said second tube, a biasing voltage for each of said tubes, and circuit means applying said biasing and control voltages to jointly control conduction of said tubes, the first of said tubes being biased further beyond cut-off than said second tube whereby said second tube will reach conduction in advance of said first tube.

5. In an aircraft automatic load release system, means for transmitting a frequency modulated radio wave from the aircraft to a target, means for receiving the target reflected wave, means for mixing the transmitted and reflected waves to produce the difference frequency wave, means for deriving an output from said difference frequency wave variable with target range and range rate of change with respect to the aircraft, first and second control tubes each having an input and output circuit, a relay connected to the ouput circuit of said first tube for releasing the load from the aircraft, an alarm relay connected to the output circuit of said second tube, an alarm device controlled by said alarm relay for indicating the operation of said releasing relay, means applying said variable output to the input circuits of said tubes to control conduction thereof, and means biasing said tubes differently beyond cut-off whereby said second tube reaches conduction in advance of said first tube.

6. In an aircraft automatic load release system, means for transmitting a frequency modulated radio wave from the aircraft to a target, means for receiving the target reflected wave, means for mixing the transmitted and reflected waves to produce the difference frequency wave, means for deriving a voltage from said difference frequency wave, said voltage becoming less positive as the target range decreases, first and second control tubes, a load release device responsive to the output of said first tube for releasing the load from the aircraft, an alarm device responsive to the output of said second tube, means applying said voltage to said tubes to control conduction thereof, and means biasing said tubes differently beyond cut-off whereby said second tube reaches conduction in advance of said first tube.

7. In an aircraft automatic load release system including means for producing an output signal proportional to the range and range rate of change between a target and the aircraft, the combination comprising means responsive to the output signal for releasing the load from the aircraft, means responsive to the output signal for indicating the incipient operating condition of said releasing means, means for rendering said indicating means operable in advance of the operation of said releasing means, said last named means including a pair of differently biased electron discharge tubes controlling the operation of said indicating means and said releasing means respectively.

References Cited in the file of this patent

UNITED STATES PATENTS

| Number | Name | Date |
|---|---|---|
| 2,268,587 | Guanella | Jan. 6, 1942 |
| 2,268,643 | Crosby | Jan. 6, 1942 |
| 2,301,929 | Budenbom | Nov. 17, 1942 |
| 2,441,657 | Blitz | May 18, 1948 |
| 2,454,009 | Sanders | Nov. 16, 1948 |